Nov. 14, 1950  L. H. BROWNE  2,529,997
EPICYCLIC DRIVE
Filed Dec. 7, 1946  4 Sheets-Sheet 1

INVENTOR
LINDSAY H. BROWNE
BY
Van Deventer & Gris
ATTORNEYS

Nov. 14, 1950  L. H. BROWNE  2,529,997
EPICYCLIC DRIVE

Filed Dec. 7, 1946  4 Sheets-Sheet 2

INVENTOR
LINDSAY H. BROWNE
BY
ATTORNEYS

Nov. 14, 1950  L. H. BROWNE  2,529,997
EPICYCLIC DRIVE
Filed Dec. 7, 1946  4 Sheets-Sheet 3

INVENTOR
LINDSAY H. BROWNE
BY
Van Deventer & Grier
ATTORNEYS

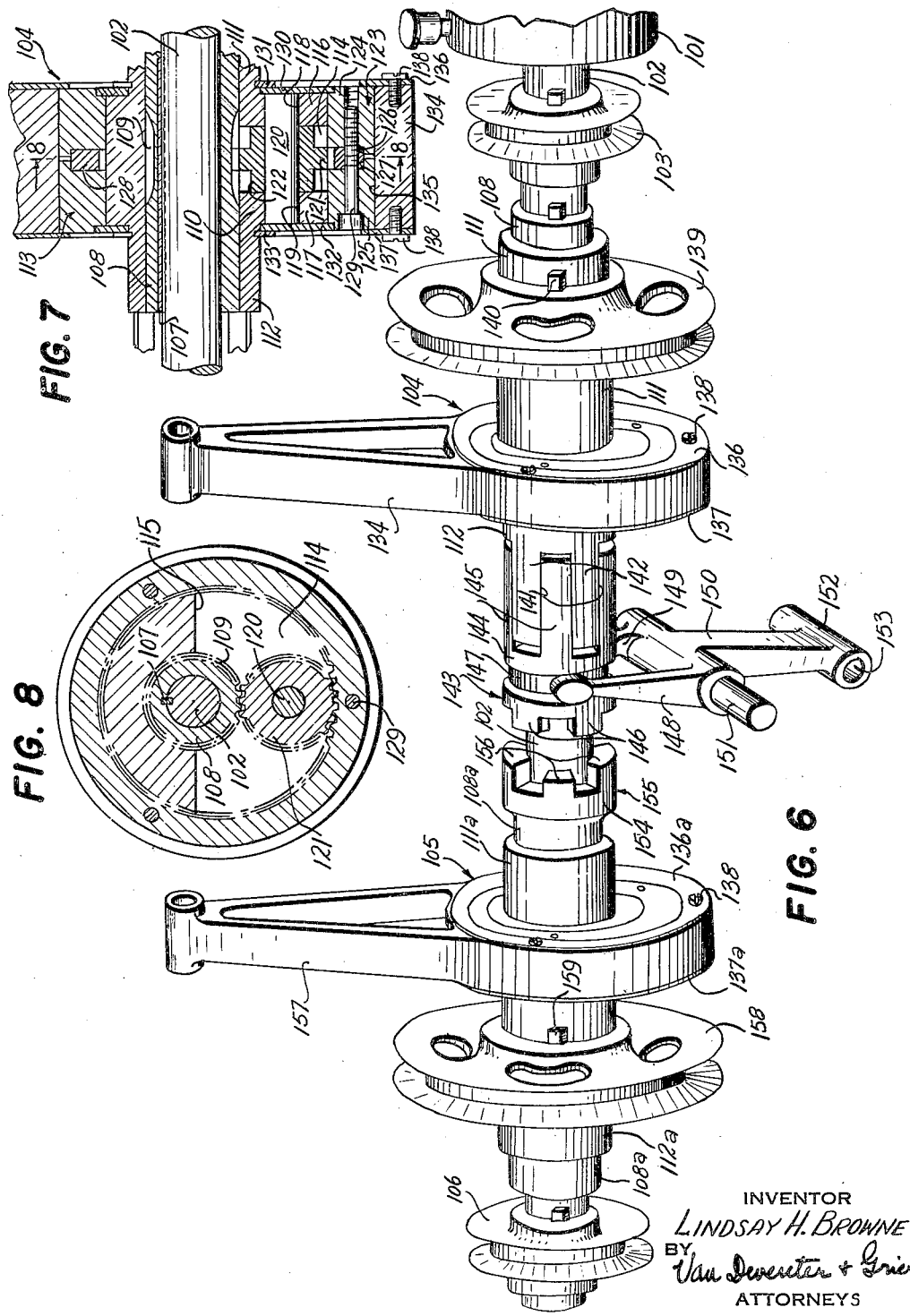

Patented Nov. 14, 1950

2,529,997

UNITED STATES PATENT OFFICE 2,529,997

EPICYCLIC DRIVE

Lindsay H. Browne, Westport, Conn., assignor to American Brake Shoe Company, a corporation of Delaware Application December 7, 1946, Serial No. 714,777

16 Claims. (Cl. 74—86)

1

This invention relates to improvements in epicyclic drives, and is a continuation, in part, of application Serial No. 647,078, filed February 12, 1946.

The disclosure in said application relates to an epicyclic drive in which a race is carried by a drive member, and a second race eccentric thereto is provided in a reciprocatory member, and a single roller member is maintained in rolling contact with both said races.

Now in order to hold said races in eccentric relation a filler block is employed therebetween and carries bearings which engage said shaft and which also engage the inner surface of said reciprocatory member. The filler block has a cutaway portion so that the roller member can be accommodated, and spring pressed means mounted in the filler block engages the roller member and maintains it in rolling engagement with the two races. This arrangement transforms the high speed rotary motion of a motor or prime mover (connected to said shaft) into reciprocatory motion at substantially less strokes per minute than the R. P. M. of the motor.

According to the present invention the inner and outer races are employed with a roller member therebetween, the filler block maintains the eccentricity of the races, and the member carrying the outer race moves with a gyratory motion when connected through a linkage to a fixed point. The filler block has an extension concentric with the shaft and lying outside of the path of the roller around said races. By placing power take-offs on the shaft and on the sleeve which is concentric with the shaft, I am enabled to obtain rotary motion at the speed of the inner race and rotary motion at the speed of the filler block (which is substantially the number of circuits of the roller around the outer race).

The principal object of the invention is the provision of an epicyclic drive having a plurality of rotary and/or reciprocatory power take-offs whereby different speeds may be obtained from a single motor drive.

Another object of the invention is the provision in an epicyclic drive of a drive member carrying an outwardly facing race, a driven member having an inwardly facing race, roller means between said races, a filler block disposed between said races said filler block contacting both said races with the exception of the area occupied by said roller means and clearance areas on each side thereof, spring means carried by said filler block and urging said roller means into rolling contact with both said races, and an extension on said

2 filler block extending laterally of said driven member and adapted to carry a power take-off and rotate the same at a speed substantially equal to the number of reciprocations of said driven member.

Other objects and advantages of the invention will be apparent to those skilled in the art upon a study of this specification and the accompanying drawings.

Referring to the drawings which are given by way of example to illustrate the invention:

Figure 6 is a perspective view of a further modification of my new and improved epicyclic drive showing several power take-offs operating at different speeds.

Figure 7 is a sectional view of a modified form of my new and improved epicyclic drive embodying compound speed reductions; and Figure 8 is a sectional elevation taken along the lines 8—8 of Figure 7.

Figure 1:
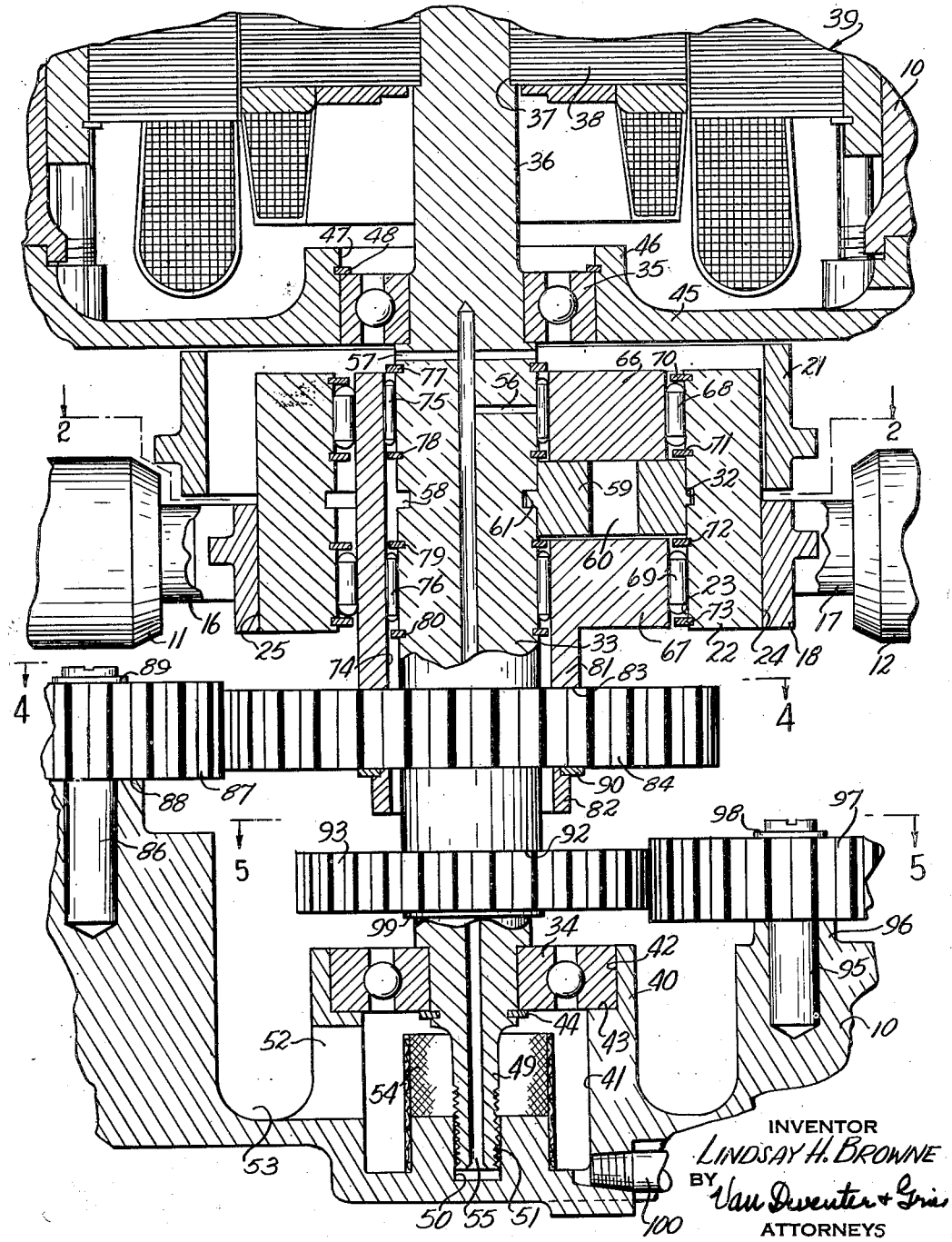
Figure 1 is a sectional elevation showing my new and improved epicyclic drive having its gyratory element operating a liquid pump and showing the power take-offs, one operating at motor speed and the other operating at substantially the speed of the gyratory element.
Figure 2:
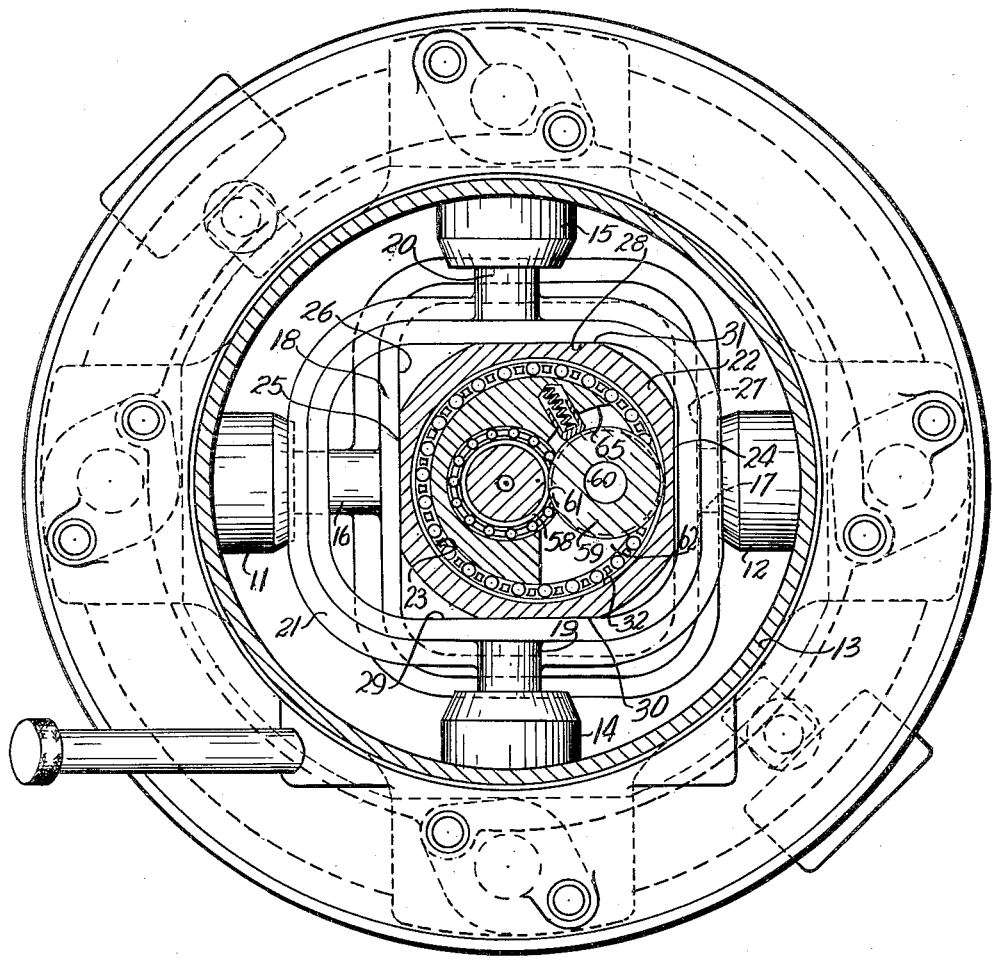
Figure 2 is a sectional plan view as seen along the lines 2—2 of Figure 1.

Referring first to Figures 1 and 2, a casing 10 has circular walls 13 which support a plurality of cylinders 11, 12, 14, 15. The cylinders 11 and 12 are opposed and have respectively cooperating therewith pistons 16 and 17 which are secured to or formed integral with a scotch yoke 18. The cylinders 14 and 15 have respectively associated therewith pistons 19 and 20, and these pistons may be secured to or formed integral with a second scotch yoke 21.

A hollow member 22 has an interior bore 23, and has outer flat surfaces 24 and 25 which cooperate with the interior flat surfaces 26 and 27 of the scotch yoke 18. The hollow member 22 also has flat surfaces 30 and 31 disposed 90° with respect to said first mentioned flat surfaces and which cooperate with the interior flat surfaces 28 and 29 of the scotch yoke 21 so that when the hollow member 22 is caused to move with a gyratory motion the pistons carried by the two scotch yokes are reciprocated in the cylinders described above.

Within the interior bore 23 of the hollow member 22, intermediate the ends thereof is formed an annular groove 32.

Extending through the bore 23 in the hollow member 22 and parallel to the axis thereof is a shaft 33 which is stepped near the lower end thereof to engage a supporting ball bearing 34, and which is also supported on a second ball bearing 35 above the hollow member 22.

The shaft 33 has a portion 36 of reduced diameter which is stepped at 37 to form a shoulder against which a rotor 38 of an electric motor 39 is positioned.

Within the lower portion of the casing 10 is a boss 40 having a hole 41 formed therein. The hole 41 has a counterbore portion 42 forming a forced fit with the outer race of the ball bearing 34, and between the hole 41 and the counterbore 42 is formed a shoulder 43 against which the outer race is located. The inner race of the ball bearing 34 is secured to the shaft 33 by means of a snap ring 44 snapped into a groove formed in the shaft 33.

A web 45 formed within the casing 10 has a boss 46 formed thereon and within this boss is a bore 47 into which the outer race of the ball bearing 35 is pressed, and to form a shoulder against which this outer race may rest, a snap ring 48 is snapped into a groove formed in the bore 47.

The lower end 49 of the shaft 33 forms a working fit with the walls of a hole 50 formed within the boss 40, and this shaft is provided with screw threads 51 which tend to force oil downwardly toward the bottom of the hole 50. A hole 52 formed in the boss 40 communicates with an oil reservoir 53 in the bottom of the casing 10 so that oil may enter the lower portion of the bore 41.

Concentric with the hole 50, and joined to the casing within the bore 41 is a strainer 54 through which the oil must pass before reaching the screw 51. Extending vertically into the shaft 33 from the bottom end thereof, is a hole or passage 55 up which oil, forced to the bottom of the hole 50, may pass, and communicating with the passage 55 are radial passages 56 and 57. These radial passages are adapted to deliver oil to moving parts within the casing 10.

Formed in the shaft 33 in alignment with the groove 32 is a groove 58.

A roller 59 having a central hole 60 therethrough to lighten the same has formed integral therewith a flanged portion 61 which engages both the groove 32 and the groove 58.

Figure 3:
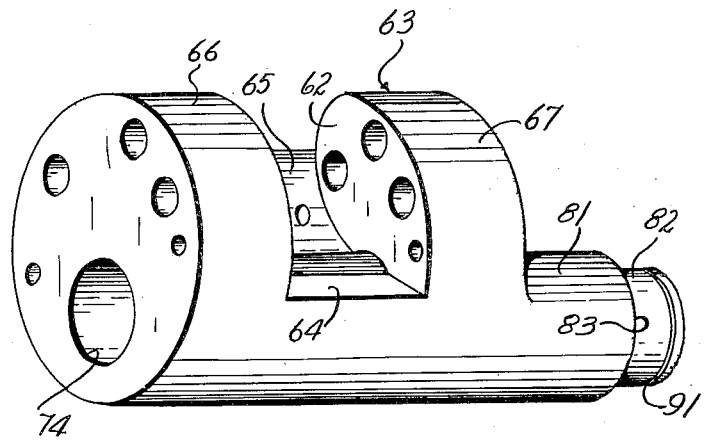
Figure 3 is a perspective view of the filler block employed in my new and improved epicyclic drive.
Figure 4:
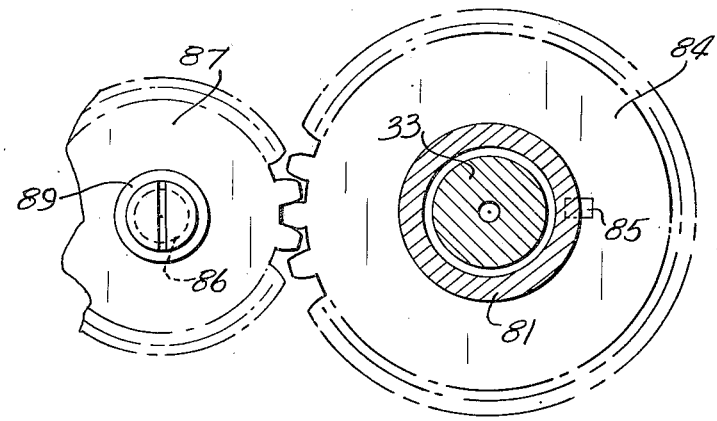
Figure 4 is a view of the power take-off from the filler block as seen along the lines 4—4 of Figure 1.
Figure 5:
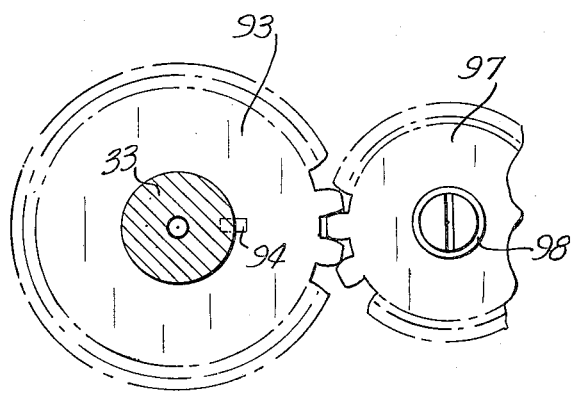
Figure 5 is a plan view of a power take-off at motor speed as seen along the lines 5—5 of Figure 1.

The roller 59 is positioned in a cavity 62 formed in a filler block generally designated by the numeral 63 (see Figure 3). The cavity at one end thereof is bounded by a substantially flat surface 64 and at the other end thereof by a curved surface 65 (see Figure 2). The filler block has slotted portions 66 and 67 which form inner races for the roller bearings 68 and 69.

The interior bore 23 forms outer races for the bearings 68 and 69 respectively and these bearings are located within said outer race as follows: the roller bearing 68 is positioned between snap rings 70 and 71 positioned in grooves within the bore 23, and the bearing 69 is located between snap rings 72 and 73 snapped into grooves formed in the hollow member 22.

Within the filler block 63 and eccentric to the surfaces 66 and 67 is an interior bore 74.

Positioned between the shaft 33 and the interior bore 74 are roller bearings 75 and 76 in spaced relation to each other.

The bearing 75 is retained between snap rings 77 and 78 snapped into grooves formed in the shaft 33, and likewise the bearing 76 is retained between snap rings 79 and 80 also snapped into grooves formed in the shaft 33, and the roller 59 engages the shaft 33 between the snap ring 78 and the snap ring 79.

Since the shaft 33 is supported on ball bearings 34 and 35 which shoulder against the shaft, there is no end play in the shaft and, therefore, the level of the groove 58 is fixed. Also since the flange 61 on the roller 59 engages the groove 58 and also the groove 32, the weight of the hollow member 22 is supported by the roller 59 and this weight is in turn supported by the groove 58 in the shaft 33.

Concentric with the bore 74 in the filler block 63 is a boss 81 having a portion 82 of smaller diameter thereby forming a shoulder 83 therebetween.

A spur gear 84 keyed to the portion 82 by means of a key 85 abuts the shoulder 83.

A stud shaft 86 mounted in the base 10 has journaled thereon a pinion 87. Pinion 87 is positioned between a shoulder 88 formed on the base 10, and a shoulder screw 89 which threadedly engages the stud shaft 86.

In the copending application Serial No. 647,078, filed February 12, 1946, I disclosed a filler block, the main purpose of which was to maintain the eccentric relation of the inner race and the outer race so that the rolling member could continuously interpose itself between the two and thus produce an epicyclic movement. The filler block carried a plunger which urged the rolling member into engagement with both races.

According to the present invention the filler block 63 may perform the same functions and in addition to those functions it has the extended portions 81, 82, from which rotary power may be taken off. This rotary power is at the same speed as the number of strokes per minute produced by the epicyclic effect.

The gear 84 is maintained on the portion 82 and against the shoulder 83 by means of a snap ring 90 which is snapped into a groove 91 formed in the reduced portion 82.

The shaft 33 above the ball bearing 34 has a portion of reduced diameter thereby forming a shoulder 92 against which a supporting gear 93, for example, is pressed. The gear 93 may engage a key 94 for fixing it on to the shaft 33. The frame 10 carries a stud 95 which projects from a boss 96 on said frame. A pinion 97 is journaled on the stud 95 and abuts the upper end of the boss 96. A shoulder screw 98 threadedly engaging the stud 95 retains the pinion 97 on the stud 95. The gear 93 is retained on the shaft 33 and in engagement with the key 94 by means of a snap ring 99.

A drain pipe 100 threadedly engages the casing 10 at the bottom of the hole 41 so that the oil may be drained from the interior thereof.

From the above it will be noted that in addition to producing a reciprocatory movement of the pump cylinders, for example, my new and improved drive may have a plurality of power take-offs at different speeds; for example, the take-off gear 93 rotates at full motor speed; the take-off in the form of the gear 84 rotates at a rate of speed equal to the number of gyrations per minute. Obviously in some instances it may not be desired to utilize the gyratory motion and in such instances my new and improved drive is simpler and has less wearing parts than the equivalent gear reduction.

Since the action of the pump is fully explained in copending application Serial No. 647,078, it is not deemed necessary to repeat the description in the present application.

Referring now to Figures 6, 7, and 8, a further modification of my new and improved epicyclic drive, wherein several drives are compounded, is shown.

An electric motor 101 has a shaft 102 which may, for example, rotate at 1800 R. P. M. The shaft 102 may have keyed thereto a pulley 103. This shaft extends through one of my improved epicyclic drives, generally designated by the numeral 104, and through a second such drive generally designated by the numeral 105 and said shaft may have keyed thereto, near the left end thereof, a pulley 106 by means of which power at 1800 R. P. M. may be taken off.

The epicyclic drives 104 and 105 may be identical or they may be different in construction and/or different in the amount of reduction incorporated therein. For example, in copending application Serial No. 698,154, filed September 20, 1946, and which issued as Patent No. 2,506,133 on May 2, 1950 one modification is shown wherein there is a single reduction between the rotative shaft and the outer member; and in another modification the reduction between the two members is compounded.

Figure 7 represents a sectional elevation along the axis of the epicyclic drive 104. The shaft 102 has keyed thereto, by means of a key 107, a sleeve 108. This sleeve intermediate the ends thereof has gear teeth 109 forming a pinion.

A rotor 110 journaled on the sleeve 108 has bosses 111 and 112 in alignment with one another. Formed integral with the bosses 111 and 112 is an intermediate eccentric portion 113 having a transverse slot 114 formed therein intermediate the ends thereof said slot terminating along a line 115 (Figure 8) to form a flat surface thereby providing spaced eccentric portions 116 and 117 having aligned holes 118 and 119 respectively formed therein.

A pin 120 forms a press fit in the holes 118 and 119. A pinion 121 has a hub 122 which is bored out and journaled on the pin 120. The eccentricity of the holes 118 and 119 is such that the pitch circles of the teeth 109 and of the teeth on the pinion 121 are tangent.

A ring member generally designated by the numeral 123 is comprised of rings 124 and 125. The ring 124 has a counterbore 126 formed on its left end, and the ring 125 has a counterbore 127 formed on its right end.

Positioned within the counterbores 126 and 127 is an internal ring gear 128. The thickness of the ring gear 128 is greater than the sum of the depths of the counterbores 126 and 127 so that when the rings 124 and 125 are firmly clamped together by means of screws, one of which is shown at 129 extending therethrough, the ring gear 128 is firmly clamped between the ring members 124 and 125. The pitch diameter of the ring gear 128 is tangent to the pitch circle of the pinion 121. The ring member 124 is counterbored to accommodate a closure ring 130, and this closure ring is retained in the counterbore by means of a snap ring 131 which engages a groove formed in the boss 111. The ring member 125 is also counterbored to accommodate a closure ring 132, and this closure ring is retained in the counterbore by means of a snap ring 133 engaging a groove formed in the boss 112.

The ratios of the pinion teeth 109, the pinion 121, and the internal ring gear 128 are such that, for example, when the shaft 102, and the sleeve 108 keyed thereto, are rotated at 1800 R. P. M., the connecting rod 134 will make 600 reciprocations per minute. The connecting rod 134 has an internal bore 135 forming a working fit with the exterior surfaces of the ring member 123, and this crank may be retained on the ring member 123 in any suitable manner, for example, by means of flat rings 136 and 137 secured to the crank by means of screws 138. As the crank 134 is caused to make 600 reciprocations per minute by the eccentric ring member 123, the boss portions 111 and 112 at the same time make 600 revolutions per minute so that a pulley, such as the pulley 139, keyed to the boss 111 by means of a key 140, serves as a power take-off for rotary speeds at 600 R. P. M. (which is one-third of the speed of the input).

The boss 112 may have a plurality of slots 141 formed therein, and the webs 142 therebetween form splines.

Forming the working fit on the shaft 102 is a clutch member generally designated by the numeral 143. This clutch member has a sleeve portion 144 with slots formed therein thereby leaving splines 145 which engage and cooperate with the splines 142 with the result that the clutch member 143 always rotates while the boss 112 is rotated. The clutch member has formed on the opposite end thereof splines 146, and between the splines 146 and the splines 145 is formed a groove 147 which is engaged by arms 148 and 149 of a shifter yoke 150. The yoke 150 is journaled on a shaft 151, and a boss 152 has a hole 153 therethrough adapted to be engaged by a suitable shifter (not shown).

Since the drives 104 and 105 are identical, and since 104 is described in detail, the elements of the drive 105 are given the same numerals as the corresponding elements in the drive 104 followed by the letter *a*. For example, the boss in the drive 105 corresponding to the boss 111 in the drive 104 is given the numeral 111*a*, and the boss 112 is given the numeral 112*a*, etc.

The sleeve 108*a* on the right end thereof has an extension hub 154 which carries a clutch member 155. The clutch member 155 is slotted out to leave axial webs 156 adapted to be engaged by the webs or teeth 146 when the shifter is moved to swing the yoke 150 about the shaft 151 in a counterclockwise direction, and thus move the clutch member 143 axially toward the left. When this is done the webs or teeth 146 enter the spaces between the webs 156, and the bosses 111*a* and 112*a* are rotated at, for example, the 600 R. P. M. rate.

Now since the sleeve 108*a*, when the clutch members 143 and 155 are engaged, is rotated at a speed of 600 R. P. M. for example, and since the epicyclic drive 105 is identical with the drive 104, the reduction is the same; therefore, with the sleeve 108*a* rotated at 600 R. P. M. the drive 105 will cause the crank arm 157 to move at 200 reciprocations per minute.

A pulley 158 secured to the boss 112*a* by means of a key 159, will rotate at 200 R. P. M. and, therefore, will serve as a power take-off for rotary motion at that speed. When it is desired to cause the drive 105 to cease operating, the clutch members 143 and 155 may be separated.

From the above it will be seen that by employing two of my new and improved epicyclic drives I can obtain power take-offs of rotary motion at 1800 R. P. M., 600 R. P. M., and 200 R. P. M., and reciprocatory motion at the rates of 600 per minute and 200 per minute.

Obviously with other ratios any desired speeds both reciprocatory, and rotary, may be obtained.

It will also be obvious that although I have shown gear reductions in my drives 104 and 105, others of my drives including roller members or balls may be used to effect similar reductions. This is especially true where exact timings are not necessary.

What is claimed is:

1. In an epicyclic drive, a rotatable shaft and means to drive the same, an inner race on said shaft, a member adapted to be moved on a gyratory path, said member including an inwardly facing outer race, a roller member between and engaging both said races, a filler block between said races and adapted to hold said races in eccentric relationship, said filler block having a portion thereof cut away to accommodate said roller member, a boss formed integral with said filler block and concentric with said shaft, and means cooperating with said boss for taking off rotary power therefrom.

2. In an epicyclic drive, a rotatable shaft and means to drive the same, an inner race on said shaft, a member adapted to be moved on a gyratory path at a rate of less gyrations per minute than the number of revolutions per minute of said shaft, said member having an interior bore formed therein at least a portion of which forms an outer race, a roller member between and engaging said races, a filler block between said races anad having a cavity formed therein clearing said roller member, said filler block having its outer face concentric with said outer race and having an eccentric hole formed therein the inner surface of which is concentric with said inner race and which embraces said shaft, and boss means extending axially from said filler block and having its outer surface parallel to said shaft whereby said boss means may be utilized for a rotary power take-off.

3. In an epicyclic drive, a rotatable shaft carrying an outwardly facing inner race, a member adapted to be moved on a gyratory path and having an inwardly facing outer race formed therein, a roller member between and engaging both said races, a filler block between said races and adapted to hold them in eccentric relationship, said filler block having a cavity formed therein clearing said roller member, said filler block also having an inwardly facing outer race adjacent to said outwardly facing inner race and having an outwardly facing inner race adjacent to said first inwardly facing outer race, frictionless bearing means between said first inner race and the outer race on said filler block, other frictionless bearing means between said first inwardly facing outer race and said outwardly facing race on said filler block, a boss formed integral with said filler block and embracing said shaft in concentric relation therewith, and means cooperating with said boss for taking off rotary power therefrom at a speed equal to the number of gyrations of said member per minute.

4. The invention according to claim 3, in which the cavity formed in said filler block is positioned intermediate the ends thereof and in which each of said frictionless bearing means is comprised of a pair of spaced roller bearings.

5. The invention according to claim 3, in which the boss formed integral with the filler block is stepped to form a shoulder against which said means for taking off rotary power may abut.

6. The invention according to claim 3, in which said filler block and the boss formed integral therewith are maintained in definite relation to said member by means of a flange formed on said roller member and engaging aligned grooves formed on the outer surface of said shaft and on the interior of said member.

7. In an epicyclic drive, a rotatable shaft carrying an outwardly facing inner race, a hollow member adapted to be moved on a gyratory path and having an inwardly facing outer race formed therein, means between said races for holding them in eccentric relationship and including a portion concentric with said shaft and adapted to rotate at a speed equal to the number of gyrations of said member, said concentric portion being adapted to function as a rotary power take-off at said speed, roller means between and contacting said races at points of greatest eccentricity thereof, and means for driving said shaft.

8. In an epicyclic drive, a rotatable shaft and means to drive the same, engageable means on said shaft, a hollow member adapted to be moved on a gyratory path and carrying a second engageable means in alignment with said first engageable means, means for maintaining said engageable means in eccentric relationship to each other, means journaled in said last means and engaging both said engageable means for causing said member to move on said gyratory path as aforesaid, and means adapted to be rotated, said last means engaging and driven by said means for maintaining said engageable means in said eccentric relationship.

9. In an epicyclic drive, a shaft forming a driving member, engageable means movable with said shaft and facing outwardly therefrom, a hollow housing having an inwardly facing engageable means fixed therein and having at least one annular surface concentric therewith and axially spaced apart therefrom, said housing constituting a driven member, means engaging said shaft and said annular surface for maintaining them in eccentric relation, other means journaled in said last means and engaging both said engageable means for causing said housing to move in an orbital path about said shaft at a speed less than the speed of said shaft, and boss means on said means engaging said shaft and said annular surface, said boss means being concentric with said shaft and adapted to serve as a power take-off for rotary motion at a speed substantially equal to the orbital speed of said housing.

10. In an epicyclic drive and speed reducer, a shaft and means to drive the same, a second shaft concentric therewith, cam means formed integral with said second shaft and eccentric thereto, a hollow housing having an inwardly facing surface journaled on said cam means, a clearance cavity formed in said cam means, roller means positioned in said cavity and engaging both the surface of said first shaft and said inwardly facing surface, spring loaded means in said cam means and extending into said cavity and urging said roller means into engagement with both of said last surfaces, and means connected to said hollow housing to limit its movement to gyratory motion, whereby said second shaft is caused to rotate at a speed substantially lower than the rate at which said first shaft is driven.

11. In a speed reducer adapted to be connected to a prime mover for furnishing gyratory motion at two different rates and rotary motion at several different speeds, a shaft driven by said prime mover and forming a common support, a first epicyclic drive of the character described having a pinion sleeve therein keyed to said shaft, having a second shaft therein concentric with said first shaft and an epicyclic movement between said shafts adapted to rotate said second shaft at a speed substantially less than the speed of rotation of said first shaft, a second like epicyclic drive freely supported on said first shaft and including a like second shaft co-axial with and driven by the second shaft in said first epicyclic drive, said second drive including an epicyclic movement adapted to drive its second shaft at a rate of speed substantially less than the rate of rotation of the second shaft in said first epicyclic drive.

12. In a speed reducer adapted to be connected to a prime mover, a shaft driven by said prime mover, a first epicyclic drive of the character described having a pinion member keyed on said shaft, and having a second shaft therein concentric with and journaled on said first shaft, and elements between said shafts for producing an epicyclic movement adapted to rotate said second shaft at a speed substantially less than the speed of rotation of said first shaft, a second like epicyclic drive freely supported on said shaft and including a like second shaft driven by the second shaft in said first epicyclic drive, said second drive also including elements between its shafts for producing an epicyclic movement and adapted to drive its second shaft at a rate of speed substantially less than the rate of rotation of the second shaft in said first epicyclic drive.

13. In an epicyclic drive, a rotatable shaft, engageable means thereon, a hollow member adapted to be moved in a gyratory path and carrying a second engageable means, means for maintaining said engageable means in eccentric relationship to each other, said maintaining means having a cavity, a rotatable element within said cavity and engaging both said engageable means for causing said hollow member to move in said gyratory path, and power take-off means connected to said maintaining means for operation thereby.

14. In an epicyclic drive, a rotatable shaft, an inner race on said shaft, a member adapted to be moved on a gyratory path, said member including an inwardly facing outer race, a roller member between and engaging both said races, a filler block between said races and adapted to hold said races in eccentric relationship, said filler block having a portion thereof cut away to accommodate said roller member, a boss formed integral with said filler block and concentric with said shaft, and means cooperating with said boss for taking off rotary power therefrom.

15. In an epicyclic drive, a rotatable shaft, a hollow member adapted to be moved on a gyratory path, said member having an interior bore, a filler block having a longitudinal hole therein in concentric relation to the axis of said shaft and having an external surface in concentric relation to the bore in said member, a rotatable member between and engaging both said shaft and said bore, said filler block having a clearance space formed therein for said rotatable member, and a boss formed integral with said filler block and extending axially beyond the bounds of said hollow member and adapted to be used as a rotary power take-off.

16. In an epicyclic drive and speed reducer, a shaft, and means to drive the same, a sleeve keyed to said shaft and having gear teeth formed thereon, a second shaft journaled on said sleeve and concentric with said first shaft, cam means movable with said second shaft and eccentric thereto, a clearance cavity formed in said cam means and a continuation of said cavity formed in said second shaft and communicating with said gear teeth on said sleeve, a stub shaft mounted in said cam means parallel to said first shaft and extending through said cavity, a pinion journaled on said stub shaft positioned within said cavity and meshing with said gear teeth, a hollow housing journaled on the outer surface of said cam and having inwardly facing internal gear teeth therein in alignment with said cavity and meshing with said pinion, and means cooperating with said hollow housing to limit its movement to gyratory motion whereby the rate of rotation of said second shaft is lower than the rate at which said first shaft is driven, said first-mentioned shaft forming a support, one end of said second shaft having a movable member of a clutch slidably connected thereto, and a second epicyclic drive positioned on said first-mentioned shaft in coaxial relation with said first drive and having its sleeve free on the drive shaft upon which it is positioned in end to end relation to said movable clutch member, the end of said sleeve being so formed as to be adapted to be engaged by said movable member, whereby said drives, when so engaged, deliver rotary power from said second shaft in said first drive at a speed lower than the rate at which said first shaft is driven and said second shaft in said second drive delivers rotary speed at a rate lower than the rate of rotation of said second shaft in said first drive, and gyratory motion is provided at two different rates of speed, one by said first drive and the other by said second drive.

LINDSAY H. BROWNE.

REFERENCES CITED

The following references are of record in the file of this patent:

UNITED STATES PATENTS

| Number | Name | Date |
| --- | --- | --- |
| 1,863,667 | Miranda | June 21, 1932 |
| 1,964,730 | Harris | July 3, 1934 |
| 2,332,970 | Huber | Oct. 26, 1943 |
| 2,460,428 | O'Leary | Feb. 1, 1948 |